United States Patent [19]

Zoch et al.

[11] Patent Number: 5,565,094
[45] Date of Patent: Oct. 15, 1996

[54] APPARATUS FOR PURIFYING AND CONDITIONING TURBINE LUBRICATING OIL

[75] Inventors: Roger L. Zoch, McFarland; David A. Meier, Milton, both of Wis.

[73] Assignee: Nelson Industries, Inc., Stoughton, Wis.

[21] Appl. No.: 298,386

[22] Filed: Aug. 30, 1994

[51] Int. Cl.$^6$ .................................................. B01D 35/00
[52] U.S. Cl. .......................... 210/86; 210/87; 210/90; 210/92; 210/95; 210/103; 210/104; 210/100; 210/109; 210/168; 210/416.5; 210/500.29; 210/521; 210/532.1; 210/533; 210/539; 210/540; 210/DIG. 5; 184/6.11
[58] Field of Search ............................ 184/6.11; 210/90, 210/87, 95, 92, 97, 100, 103, 104, 168, 86, 416.5, 418, 109, 457, 433.1, 488, 489, 500.29, 493.5, 496, 507, 508, 521, 532.1, 533, 538, 539, 540, DIG. 5

[56] References Cited

U.S. PATENT DOCUMENTS

| | | |
|---|---|---|
| 1,404,931 | 1/1922 | Corwin ................................ 210/532.1 |
| 4,111,806 | 9/1978 | Wright et al. ......................... 210/540 |
| 4,202,778 | 5/1980 | Middlelbeek ....................... 210/532.1 |
| 4,231,768 | 11/1980 | Seibert et al. ..................... 210/DIG. 5 |
| 4,315,822 | 2/1982 | Jaisinghani ....................... 210/DIG. 5 |
| 4,411,791 | 10/1983 | Ward ................................. 210/DIG. 5 |
| 4,892,667 | 1/1990 | Parker, III et al. .................... 210/799 |
| 5,202,031 | 4/1993 | Rymal, Jr. ............................. 210/703 |

Primary Examiner—Robert J. Popovics
Attorney, Agent, or Firm—Andrus, Sceales, Starke & Sawall

[57] ABSTRACT

An apparatus and method for removing free and emulsified water as well as solid contaminants from an oil/water mixture produced in lubricating the bearings of a steam turbine employs a singular, closed housing having a lowermost, filter-free gravity chamber, an uppermost filter element chamber, and a filter-free water collection chamber between the gravity chamber and the filter element chamber. The oil/water mixture introduced into the housing has its free water component removed in the gravity chamber and has its emulsified water and solid contaminant components removed by coalescence in the filter element chamber. Free water, emulsified water and solid contaminants are collected, monitored and selectively drained from the water collection chamber and gravity chamber.

23 Claims, 5 Drawing Sheets

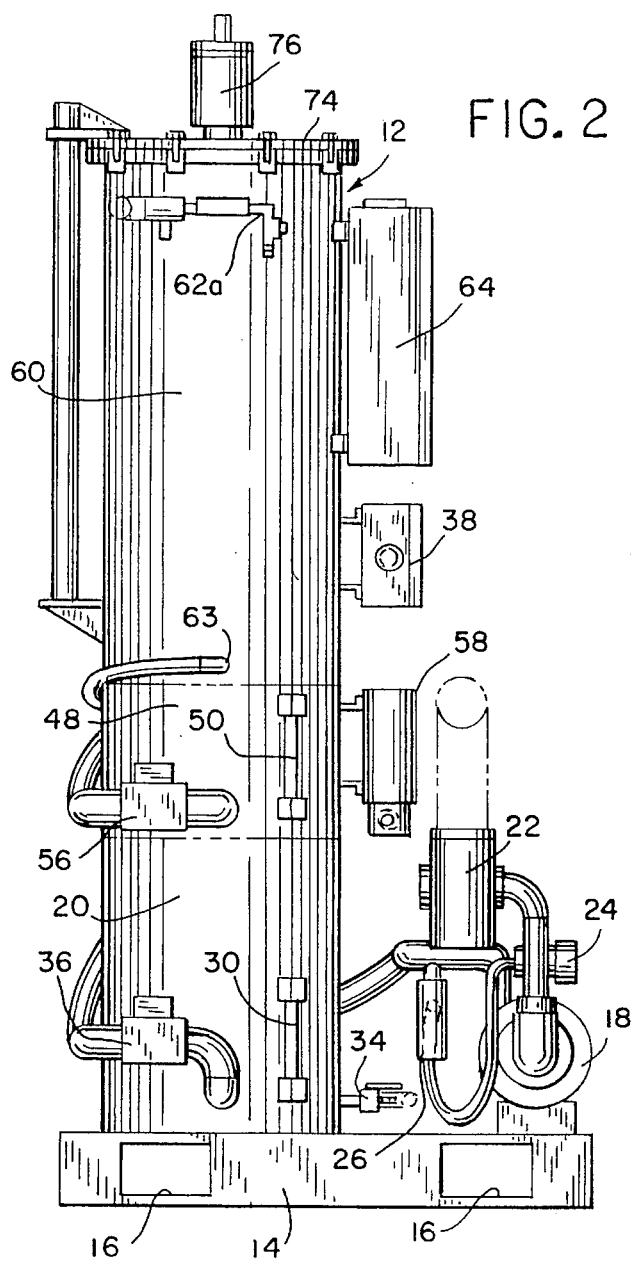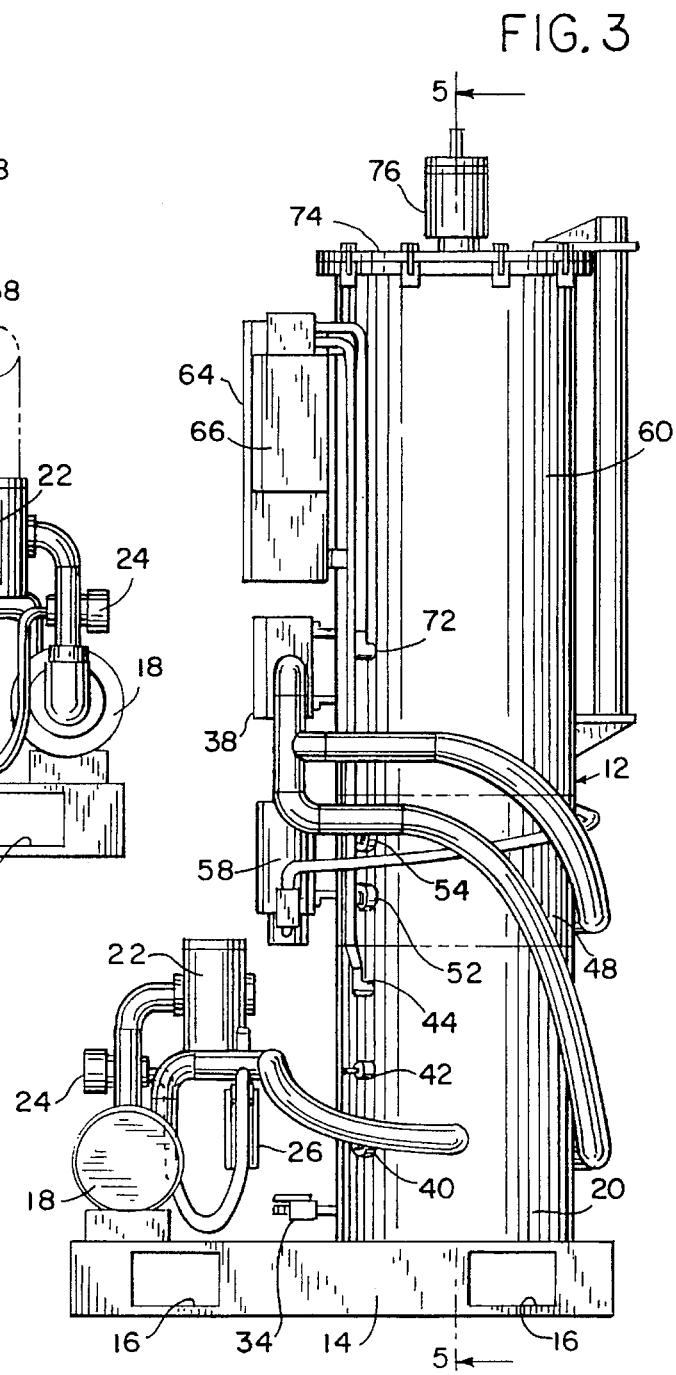

5,565,094

APPARATUS FOR PURIFYING AND CONDITIONING TURBINE LUBRICATING OIL

TECHNICAL FIELD

This invention relates generally to the in situ purification and conditioning of oil used in lubricating steam turbines and, more particularly, pertains to an apparatus and method for removing water and solid contaminant components from a turbine oil/water mixture employing a two stage system in a single, three chamber housing.

BACKGROUND OF THE INVENTION

Water contamination in the bearing lubricating oil of steam turbines causes significantly greater wear and maintenance costs for the operator/owner. When water is removed through static coalescence or mechanically by centrifuging, it is fairly common to encounter concentrations of nearly 100% water. Water concentrations above 0.5% are not effectively removed by either method and can cause premature failure in the coalescing elements. To handle such situations today, a technician must manually drain the sump until he or she feels the water concentration can be handled by the method being used. In addition to the expense of the technician and lost oil, there are the costs for disposing of the oil/water mixture properly, the environmental costs for the oil entering the sewage system, or the cost of conditioning the lubricating oil at a remote station.

One attempt to overcome these drawbacks and provide on site processing of oil is disclosed in U.S. Pat. No. 4,892,667 issued Jan. 9, 1990 to Parker, III et al. In this system, a lubricating oil processing unit is provided in which the oil is first filtered to remove some of the free water and also entrained particulate matter, and passed through a coalescing unit for final and complete free and emulsified water removal, and finally a polishing filter for complete removal of entrained particulate matter and returned to the lubricating oil reservoir. The unit provides continuous processing of lubricating oil as the oil is used, that is, as it is pumped under pressure through the turbine bearings and is returned to the reservoir. In the first filter, particulate matter is removed. Also, a significant portion of the free water is separated from the oil. In other words, this serves as a preconditioning unit. The oil from this unit is then passed to a coalescing unit where the remaining free water and the water/oil emulsion is broken by passing the oil containing the emulsion through a series of materials with the first material providing very minute interstices to initiate coalescence and then passing the oil containing the water freed by coalescence outwardly through a series of different materials until the freed water progressively forms into droplets large enough to be separated by gravity or by the separator filter element from the stream of oil.

While this system has been generally satisfactory for on site processing of oil having particular ranges or parameters of viscosities, temperatures, pressures, and water concentrations, it can be appreciated that this arrangement must utilize three discrete components provided with different types of filters to attain its goal. In particular, the coalescing unit of this system depends upon a pleated filter medium, plural layers of compressed glass fiber in mat form, a non-wettable screen, a non-compressed layer of glass fibers and a closely woven jacket of non-wettable fabric before the oil is sent to a final polishing unit containing a multilayered filter medium.

Notwithstanding this and other previous designs, it remains desirable to provide an improved turbine oil purification and conditioning apparatus of a modified type from that shown in the aforementioned prior art which is effective to remove large volumes of water concentrations and solid contaminants in turbine lubricating oil and simultaneously eliminate excessive maintenance demands and premature equipment failure. It is also highly desirable to provide an apparatus capable of purifying and conditioning oil in large volumes and removing a much higher percentage of water from the oil using a singular vessel with a simplified filter assembly. It is likewise desirable to provide a turbine oil purification and conditioning apparatus having various monitoring, control, recording and various pumping devices which will heighten the efficiency of the apparatus.

SUMMARY OF THE INVENTION

The improved purification and conditioning apparatus of the present invention advantageously provides a highly efficient, singular unit which will cleanse turbine oil continuously to dramatically reduce turbine failures resulting from contaminated turbine oil. The apparatus relies on a two stage process wherein free water is separated by gravity without the need for a filter and emulsified water and solid contaminants are removed by coalescence through a unique filter assembly.

These and other aspects are realized in an apparatus for in situ removal of free and emulsified water present in oil used for lubricating the bearings of steam turbines. The apparatus comprises a singular, closed housing having a lowermost, filter-free gravity chamber means for receiving an oil/water mixture from the turbines and separating and draining the free water from the oil/water mixture. The housing also includes an uppermost filter element chamber means for receiving the oil/water mixture from the gravity chamber means, separating the emulsified water by coalescence from the oil/water mixture and returning dewatered oil back to the turbines. Finally, the housing includes a filter-free, coalesced water collection chamber means intermediate the gravity chamber means and the filter element chamber means for collecting and draining the emulsified water separated by coalescence in the filter element chamber means.

In another aspect of the invention, a filter element assembly is used to remove emulsified water and solid contaminants from an oil/water mixture produced in steam turbines, and gather the emulsified water and solid contaminants in a drainable collection chamber. The assembly comprises an elongated standpipe formed with a plurality of perforations along a portion thereof for transmitting the oil/water mixture therethrough. A first filtering stage surrounds the standpipe and is comprised of a pleated cellulose media, felt, fiberglass and foam composite having an inner surface and an outer surface for coalescing the emulsified water from the oil/water mixture flowing through the perforations and separating the solid contaminants from the oil/water mixture along the outer surface of the composite such that the emulsified water will fall by gravity into the collection chamber. A second filtering stage surrounds, is spaced from, and extends lengthwise beyond the first filtering stage and is comprised of a treated, pleated cellulose media having an inner surface and an outer surface for further collecting emulsified water carried by the oil/water mixture from the first filtering stage along the inside surface of the treated, pleated cellulose media such that the emulsified water further falls by gravity into the collection chamber.

In yet another aspect of the invention, there is contemplated a method for removing free and emulsified water and solid contaminants present in oil used in lubricating the bearings of turbines. The method comprises the steps of providing a closed housing having a lowermost, filter-free gravity chamber, an uppermost filter element chamber and a filter-free water collection chamber intermediate the gravity chamber and the filter element chamber; pumping an oil/water mixture from the turbines into the gravity chamber; separating the free water of the oil/water mixture in the gravity chamber; pumping the oil/water mixture to a filter element assembly in the filter element chamber in which emulsified water and solid contaminants are separated, and fall by gravity into the water collection chamber and pumping the oil with the free and emulsified water and solid contaminants removed back to the bearings of the turbines. In the aforementioned method, the step of separating the emulsified water and solid contaminants in the filter element includes the steps of providing a first filtering stage for coalescing the emulsified water and separating the solid contaminants from the oil/water mixture along an outer surface of the first filtering stage and providing a second filtering stage surrounding, spaced from and extending lengthwise beyond the first filtering stage for further collecting the emulsified water along an inside surface of the second filtering stage.

BRIEF DESCRIPTION OF THE DRAWINGS

The invention will become better understood by reference to the following detailed description of the preferred exemplary embodiment when read in conjunction with the appended drawings, wherein like numerals denote like elements

FIG. 2 is an end view taken from the left hand side of FIG. 1;

FIG. 3 is an end view taken from the right hand side of FIG. 1;

DETAILED DESCRIPTION OF THE PREFERRED EMBODIMENT

Figure 1:
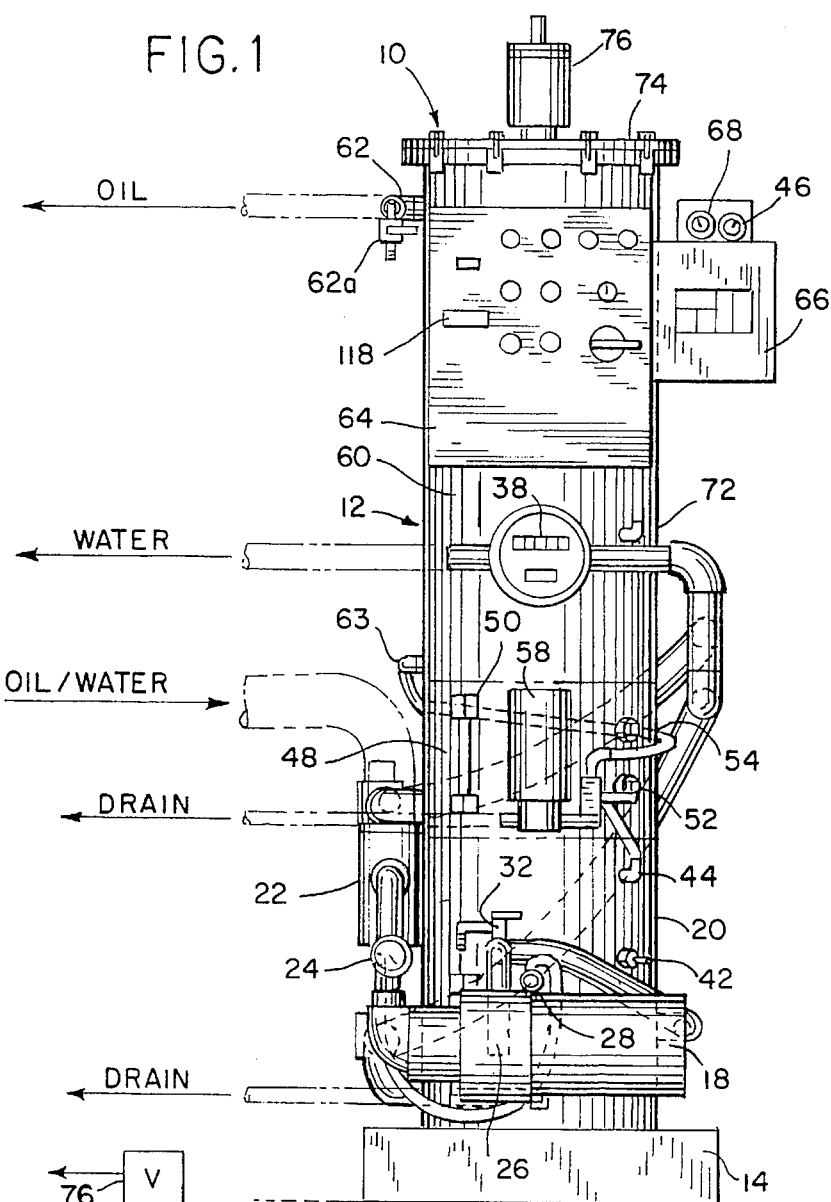
FIG. 1 is a front elevational view of an oil dewatering apparatus embodying the present invention.

Referring now to FIGS. 1–3, the numeral 10 generally identifies an apparatus or unit utilized on site in removing water and solid contaminants from oil used in the lubrication of steam driven turbines. Unit 10 is typically comprised of a large, closed, cylindrical shell 12 secured on a platform or skid 14 capable of being transported from one turbine site to another by means of forklifts or the like which engage apertures 16 in the platform 14. From the outset, it should be appreciated that the purpose of unit 10 is to separate free and emulsified water as well as extraneous contaminant particles present in an oil/water mixture supplied from the turbines, selectively collect, monitor and drain the separated constituents and ultimately return purified and reconditioned oil back to the turbines to perform the intended lubricating functions in the bearings of the turbines.

In this regard, shell 12 includes a supply pump 18 for introducing the oil/water mixture from the turbine into a lowermost gravity chamber 20 in which free water is initially separated. Supply pump is selected and sized to provide a non-emulsifying effect on the oil and water components of the fluid stream, while producing the desired pressure and flow. Mixture first enters an inlet strainer 22 which filters out particle contaminants. Pump 18 enables the mixture to pass a temperature gauge 24 such that an operator can constantly monitor the temperature of the incoming mixture. Pump 18 further includes a pressure relief valve 26 and a visual flow indicator 28 while the lowermost portion of shell 12 is provided with a sight gauge 30 to visually reflect the level of fluid in the gravity chamber 20. An inlet sampling valve 32 for selectively drawing a sample of incoming fluid is also provided on the outlet of pump 18. The external portion of gravity chamber 20 also includes a drain outlet 34 for selectively draining fluid from the chamber 20, and a gravity chamber solenoid valve 36 for selectively transmitting the water substantially removed from the oil/water mixture through a resettable totalizer 38. The totalizer 38 disposed on the upper portion of shell 12 records the water removed in gallons as it is expelled. Gravity chamber 20 is also designed with an invasive water probe 40, an electronic temperature indicating unit 42 and a high pressure port 44 for allowing the differential pressure to be read on a gauge 46 at the top of shell 12.

Shell 12 is also provided with an intermediate water collection chamber 48 having a sight gauge 50 for monitoring the amount of fluid therein, a pair of invasive water probes 52, 54 and a solenoid valve 56 interconnected to totalizer 38 for selectively withdrawing fluid from the water collection chamber 48. A drain pump 58 mounted externally to shell 12 outside water collection chamber 48 functions to selectively drain fluid collected in the gravity and water collection chambers 20, 48 as well as in the filter element chamber 60 to be described.

Shell 12 has an uppermost filter element chamber 60 in which the oil/water mixture is finally filtered and delivered from an oil outlet 62 back to turbines. A sampling valve 62a for selectively drawing a sample of outlet oil may be provided on oil outlet 62. Oil drain 63 is connected to drain pump 58. The external area of filter element chamber 60 is equipped with a control box 64 for controlling all functions of the unit including an adjoining variable speed motor drive unit 66 on top of which is mounted a vacuum gauge 68 and a differential pressure gauge 46, which is further connected to a low pressure port 72. The top of the shell 12 has a removable cover 74 which may be hydraulically assisted for providing maintenance access to unit 10 and supports an air release valve 76 which automatically bleeds air from shell 12.

Figure 5:
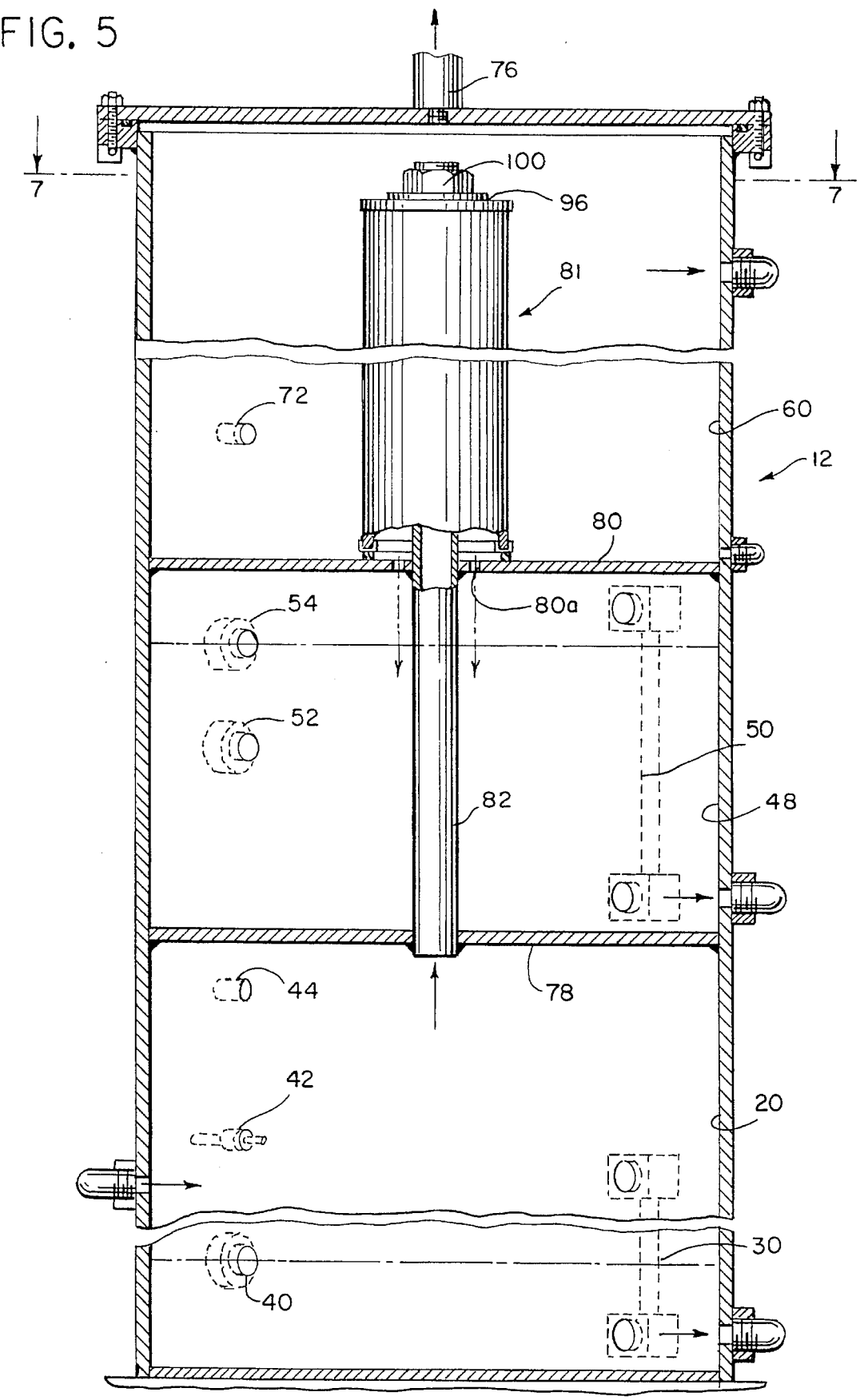
FIG. 5 is a cross-sectional view taken on line 5—5 of FIG. 3.
Figure 7:
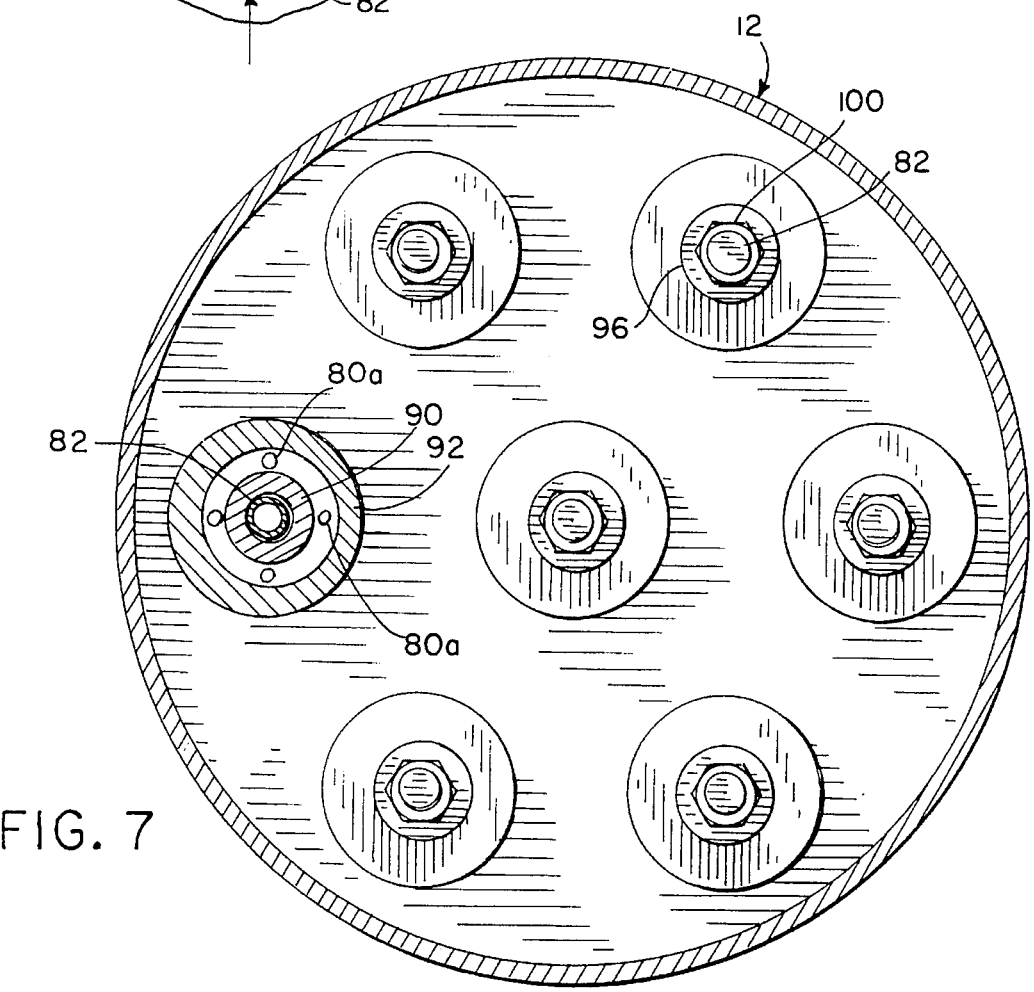
FIG. 7 is a cross-sectional view of the apparatus taken on line 7—7 of FIG. 5.

Turning now to the internal structure of unit 10, FIG. 5 depicts aforementioned gravity chamber 20, water collection chamber 48 and filter element chamber 60. A first horizontal partition 78 divides gravity chamber 20 from water collection chamber 48 while a second horizontal partition 80 creates a barrier between filter element chamber 60 and water collection chamber 48. It should be recognized, however, that certain portions 80a of second partition 80 are perforated to allow fluid communication between the upper two chambers 48, 60 at selected locations. The oil/water mixture, after passing through the lowermost gravity chamber 20 to separate free water, enters a series of seven parallel standpipes 82 (FIG. 7), only one of which is portrayed in FIG. 5 since each standpipe and its accompanying filter structure is identical. The oil/water mixture in standpipes 82 is delivered into a filter element assembly 81 in the uppermost filter element chamber 60 for the express purpose of separating the emulsified water component as well as any further solid contaminant from the oil/water mixture.

Figure 6:
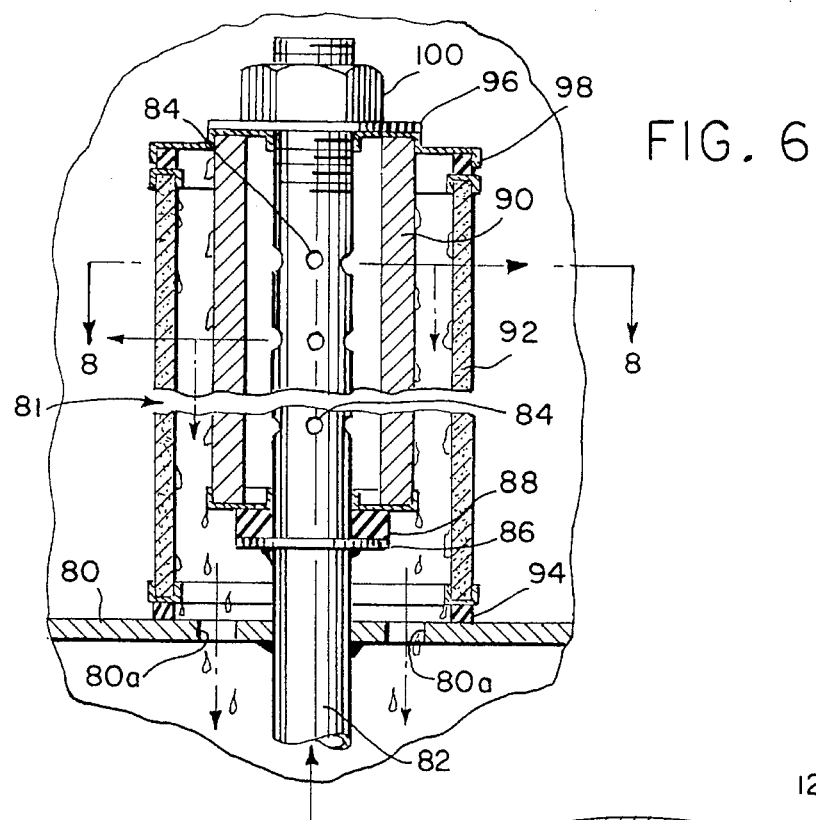
FIG. 6 is an enlarged, fragmentary cross-sectional view of a filter element assembly shown in FIG. 5.

Each standpipe 82 is an elongated cylinder extending from the top of the gravity chamber 20 through the water collection chamber 48 and into the filter element chamber 60. The upper portion of each standpipe 82 is provided with a number of perforations 84 which enable oil/water mixture to flow through and out of standpipe 82 into the two stage filter assembly 81 as best portrayed in FIG. 6. Each standpipe 82 carries a fixed support washer 86 and an internal gasket 88 which seals against the outer surface of standpipe 82 and supports the bottom of a first cylindrical or coalescing filter stage 90. A second filter or water separator stage 92 is spaced from, extends lengthwise beyond and surrounds first filter stage 90 and is supported on a gasket 94 disposed on the second horizontal partition 80 and encompassing the perforations 80a formed in the second horizontal partition 80. The upper end of each standpipe 82 is plugged, threaded and passes through a flanged washer 96 seated on top of a gasket 98 at the top of the second filter stage 92. A hold down nut 100 is screwed on the threaded portion of standpipe 82 to hold the standpipe 82 together relative to the filter assembly 81.

Figure 8:
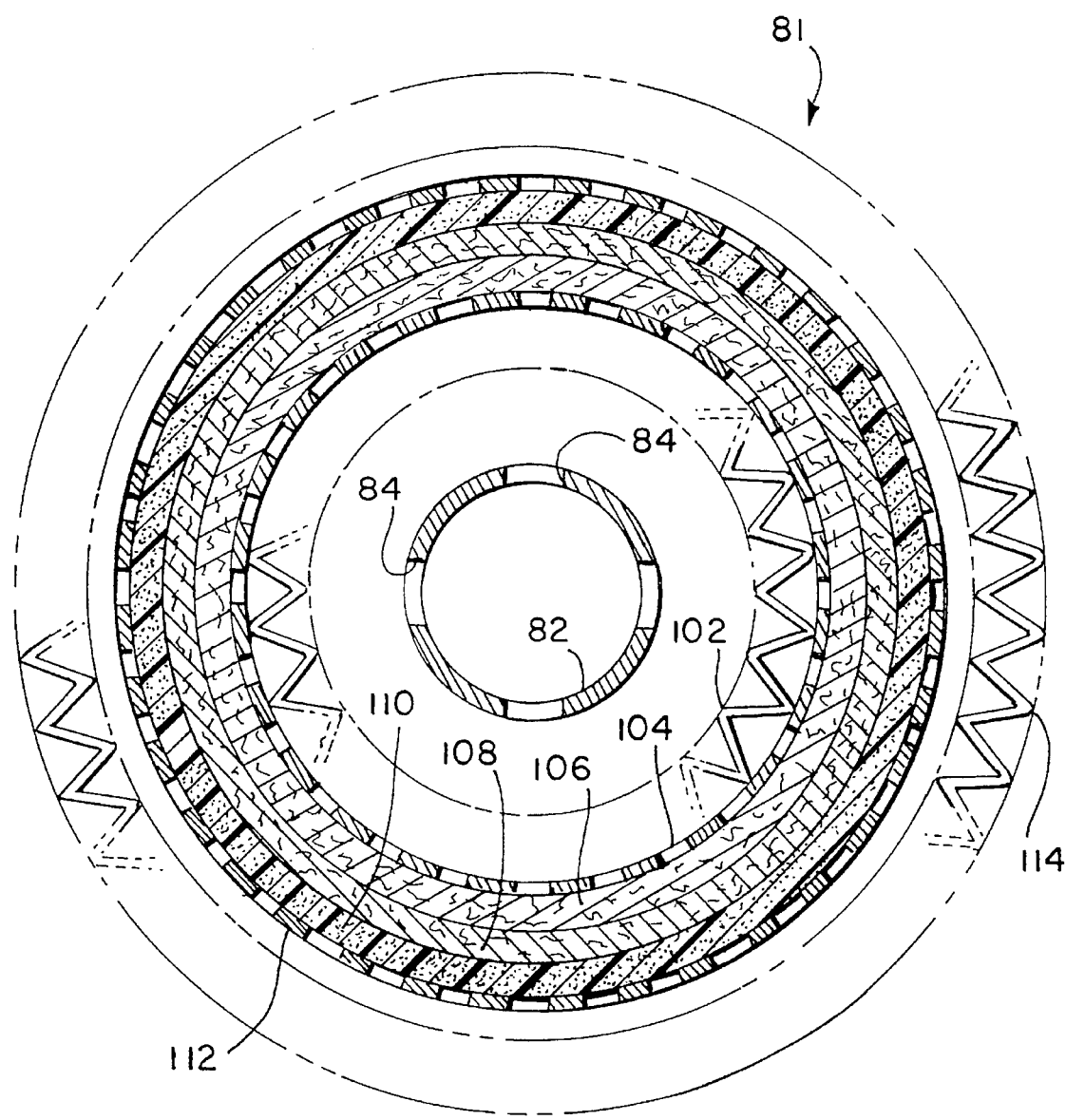
FIG. 8 is a cross-sectional view taken on line 8—8 of FIG. 6.

For a more complete understanding of the structure of first filter of coalescing stage 90 and second filter of water separator stage 92, reference is made to FIG. 8 which illustrates in detail the composition of these filters in a two stage, single element design. In particular, the innermost or coalescing stage 90 consists of four different types of media, all in direct contact with one another. The first part of the coalescing stage 90 utilizes pleated cellulose media 102 to capture solid contaminants. The specific type of pleated cellulose media selected is dependent upon its characteristics to capture a certain size particle and its capacity to retain the solids. Following a reinforcing center tube 104 of perforated sheet steel is a layer 106 of felt which provides an area of reduced density significant in providing a low restriction element. It is in this layer where water removal, especially large drop water removal, begins. The felt layer 106 also serves to protect the next layers which are multiple layers 108 of fiberglass chosen and arranged in specific order to provide optimum coalescence of water from oil. It is in this multi-layer 108 that the smallest drops of water are to be captured and pushed outwardly by the oil to an outer layer 110 of foam of a particular grade to allow the coalesced water to form large drops which are readily separated and released. Following the foam 110, is a reinforcing outer perforated tube 112 of sheet steel. Spaced slightly (i.e. ⅛ inch) from the foam layer 110 is the second or water separator stage 92 comprised of a single layer 114 of pleated cellulose media, again specifically chosen to capture a certain size particle and treated with a commercially available water-repellent element such as silicone or Scotchguard® such that passage of oil only, not water, will occur.

Figure 4:
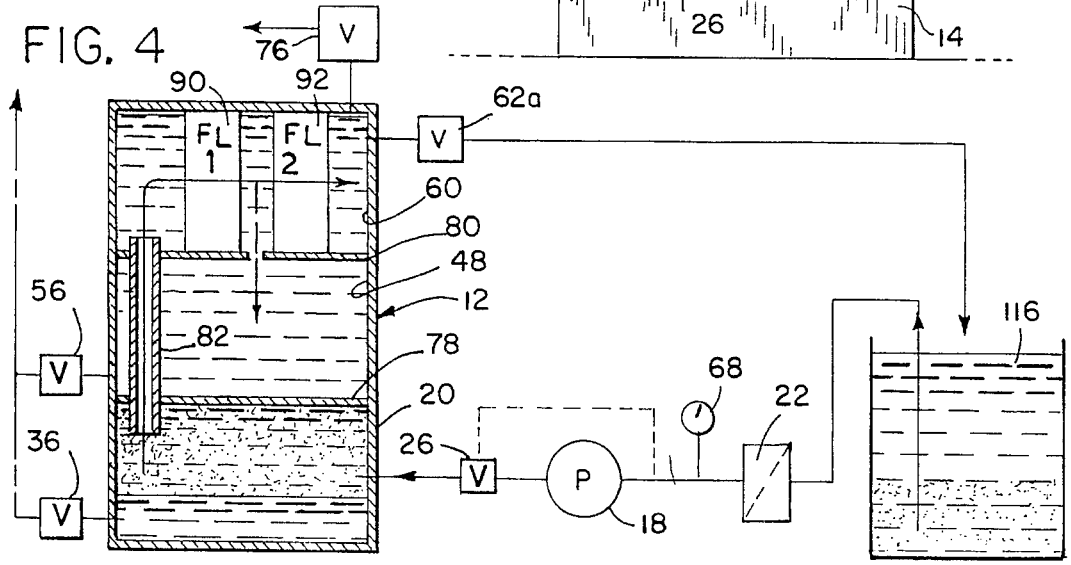
FIG. 4 is a diagrammatic representation of the oil dewatering apparatus in connection with a reservoir of a steam engine turbine.

Employing the diagrammatic illustration of FIG. 4, the operation of turbine oil purifying and conditioning unit 10 will now be explained. Assuming the unit 10 is connected to an appropriate electrical source and plumbed to the user's turbine oil reservoir 116 and waste water drain, supply pump 18 is activated to cause an oil/water mixture emanating from the reservoir 116 to flow through inlet strainer 22 to immediately filter out any unusually large contaminant particles which could be damaging to the pump 18. Oil/water mixture flow continues past vacuum gauge 68 and pressure relief valve 26 into gravity chamber 20 where the free water component of the oil/water mixture separates and settles on the bottom because of its greater density. As the volume of accumulated water rises to one-half the gravity chamber volume, it will reach the first water probe 40. Sight gauge 30 is also used to allow visual observations of the accumulated free water and is purposely disposed so the mid point of the sight gauge 30 is the same height as the water probe 40.

When the accumulated free water in gravity chamber 20 is detected by water probe 40, controls actuate solenoid valve 36 in the gravity chamber 20 which allows free water to be discharged from gravity chamber 20 after passing through the totalizer 38 which records the total discharge volume. After a predetermined value of water is discharged, solenoid valve 36 is deactivated but system supply pump 18 continues to force oil/water mixture upwardly through each standpipe 82 and then inside-out through the filter assembly 81 defined by the coalescing stage 90 and water separator stage 92. In the coalescing stage 90, emulsified water is coalesced, leaving only dissolved water in the oil/water mixture. Solid contaminants are also removed in the coalescing stage. Coalesced water forms drops on the outer surface of the coalescing or first filter stage 90 and increase in volume until their weight causes them to separate from the coalescing element surface. Larger drops fall downwardly to perforated horizontal partition 80 which allows the larger drops to fall in the water collection chamber 48.

The second filter or water separator stage 92 surrounding the first filter or coalescing stage 90 is specifically radially spaced beyond the distance at which the perforated holes 80a are formed in partition 80. Smaller water drops released from the coalescing stage 90 are carried by oil to the water separator stage 92 inner surface. The water separator stage 92 is specifically treated to resist passage of the water. The small water drops collect, combine and fall in a manner similar to that which occurs along the outer surface of the coalescing stage 90. Again, the drops formed pass through the perforated holes 80a in partition 80. Water accumulated in the water collection chamber 48 is detected by water probe 52 and discharged in the same fashion, that is by solenoid valve 56, as from the gravity chamber 20. With the solid contaminants, free water and emulsified water successfully removed, the purified and reconditioned oil is passed from the filter element chamber 60 through the oil outlet 62 and returns to the turbine oil reservoir 116.

It should be appreciated that unit 10 includes several features which promote the efficiency of water removal. For example, differential pressure gauge 46 is utilized to indicate the plugging of filter assembly 81. A switch (not shown) can be incorporated into the gauge 46 to provide automatic shutdown if excessive pressure is reached. An additional water probe 54 is located near the top of the water collection chamber 48 to shut down the system in the event water does not drain. This prevents water laden oil from being returned to the reservoir 116. A flow switch is located after the oil outlet 62 to shut down the system in the event flow would cease after a predetermined period of time. This feature prevents damage to various pieces of equipment in the event of a malfunction. A digital temperature indicator 118 is further provided to allow the operator to monitor the oil temperature inside the filter assembly 12. Drain pump 58 easily facilitates draining oil from any of the gravity, water collection and filter element chambers 20, 48, 60 through individual drain valves. Such feature is especially useful during filter element changes or when changing site locations. Automatic water drains 56, 36 are provided in the filter element chamber 60 and gravity chamber 20.

Unlike the prior art, the present invention is a single, three chamber unit employing a unique filter assembly 81 to continuously remove emulsified water and solid contaminants in a highly efficient manner. It is noteworthy that the design of the present invention does not require any filters in the gravity or water collection chambers 20, 48, which contributes to the simplified maintenance and reduced cost of the unit. In addition, it is noted that the filter assembly 81 for the present invention is deliberately constructed such that oil/water mixture will flow from inside the standpipes 82 to outside the first filter stage 90. This is important because a larger water drop can be produced. Furthermore, a smaller water drop can also be removed from the oil/water mixture in the second filter stage 92 because the outside area is greater and the velocity of the oil is lower. The cumulative effect of the two stage separator then is a more efficient water filter which returns a much cleaner volume of oil to the turbines.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. An apparatus for in situ removal of free and emulsified water present in oil used for lubricating the bearings of steam turbines, the apparatus comprising:

a singular, closed housing having a lowermost, filter-free gravity chamber means having an inlet means for receiving an oil/water mixture including free water and water emulsified in oil from the turbines, means for separating the free water from said mixture and outlet means for draining the free water from said oil/water mixture, an uppermost filter element chamber means having a coalescer filter means and an outlet means, means for placing said filter-free gravity chamber means in fluid communication with said uppermost filter chamber, said filter element chamber means receiving said oil/water mixture from said gravity chamber means, separating the emulsified water by coalescence in said coalescer filter means from said oil/water mixture and returning dewatered oil back to the turbines via said filter element chamber outlet means, and a filter-free, coalesced water collection chamber means intermediate said gravity chamber means and said filter element chamber means for collecting and draining the emulsified water separated by coalescence in said coalescer filter means of said filter element chamber means, said apparatus further including dividing means extending entirely across said housing and defining distinct horizontally disposed spaces for said lowermost gravity chamber means, said uppermost filter element chamber means and said intermediate water collection chamber means.

2. The apparatus of claim 1, including a system supply pump means for pumping the oil mixed with the free and emulsified water into said gravity chamber.

3. The apparatus of claim 2, wherein each of said gravity chamber means and said water collection chamber means is provided with a water probe means for stopping said system supply pump in the event water separated from the oil does not drain.

4. The apparatus of claim 1, said dividing means including a first horizontal partition means dividing said water collection chamber means from said gravity chamber means.

5. The apparatus of claim 4, said dividing means including a second horizontal partition means dividing said filter element chamber means from said water collection chamber means, said second horizontal partition means being perforated allowing fluid communication between said filter element chamber means and said water collection chamber means.

6. The apparatus of claim 1, wherein a drain pump is connected to said water collection chamber means.

7. The apparatus of claim 1, wherein said coalescer filter means is a two stage filter assembly means.

8. The apparatus of claim 7, including at least one standpipe means extending from said gravity chamber means to said filter element chamber means.

9. The apparatus of claim 8, wherein said at least one standpipe means is surrounded by said two stage filter assembly means.

10. The apparatus of claim 7, wherein said two stage filter assembly means includes a first stage means comprised of a pleated cellulose media, felt, fiberglass and foam composite.

11. The apparatus of claim 7, wherein said two stage filter assembly means includes a second stage comprised of a pleated cellulose media treated with a water repellent.

12. The apparatus of claim 1, wherein each of said water collection chamber means and said gravity chamber means is provided with a solenoid valve means for controlling the draining of water from said water collection chamber means and said gravity chamber means.

13. The apparatus of claim 1, wherein each of said water collection chamber means and said gravity chamber means includes a sight gauge means for monitoring the level of water collected in said water collection chamber means and said gravity chamber means.

14. The apparatus of claim 1, including an indicating means connected with said water collection chamber means and said gravity chamber means for recording the total amount of water removed from the apparatus.

15. A filter element assembly disposed in a filter chamber used to remove emulsified water and solid contaminants from an oil/water emulsion produced in steam turbines and delivered to a gravity chamber, and gather water which has been separated from said emulsion and solid contaminants in a drainable collection chamber below the filter chamber, the assembly comprising:

an elongated standpipe connecting said gravity chamber and said filter chamber and formed with a plurality of perforations along a portion thereof for transmitting the oil/water emulsion from said gravity chamber to said filter chamber;

a first filtering stage in said filter chamber surrounding said standpipe and comprised of a pleated paper, felt, fiberglass and foam composite having an inner surface and an outer surface for coalescing the emulsified water from the oil/water emulsion flowing through said perforations and separating the solids contaminants from said oil/water emulsion along said outer surface of said composite such that the coalesced water will fall by gravity into the collection chamber, said first filtering stage being elevated over a horizontal partition; and a second filtering stage in said filter chamber surrounding, spaced from and extending lengthwise beyond said first filtering stage and comprised of a pleated media treated with a water repellent element and having an inner surface and an outer surface for further coalescing emulsified water carried by the oil/water emulsion from said first filtering stage along said inside surface of said treated, pleated media such that the coalesced water further falls by gravity into said collection chamber, said horizontal partition forming a bottom portion of said second filtering stage.

16. The assembly of claim 15, including a washer attached to said standpipe below said perforations to locate and support said first filtering stage.

17. The assembly of claim 15, including means for transmitting oil with the emulsified water and solid contaminants removed back to said steam turbines.

18. The assembly of claim 15, including a differential pressure gauge means for indicating plugging of said first filtering stage and said second filtering stage.

19. An apparatus for in situ removal of free and emulsified water present in oil used for lubricating the bearings of steam turbines, the apparatus comprising:

a singular, closed housing having a lowermost, filter-free gravity chamber means having an inlet means for receiving an oil/water mixture including free water and water emulsified in oil from the turbines, means for separating the free water from said mixture and outlet means for draining the free water from said oil/water mixture, an uppermost filter element chamber means having a coalescer filter means and an outlet means, means for placing said filter-free gravity chamber means in fluid communication with said uppermost filter chamber, said filter element chamber means receiving said oil/water mixture from said gravity chamber means, separating the emulsified water by coalescence in said coalescer filter means from said oil/water mixture and returning dewatered oil back to the turbines via said filter element chamber outlet means, and a filter-free, coalesced water collection chamber means intermediate said gravity chamber means and said filter element chamber means for collecting and draining the emulsified water separated by coalescence in said coalescer filter means of said filter element chamber means, wherein said filter element chamber means includes a two stage filter assembly means.

20. The apparatus of claim 19, including at least one standpipe means extending from said gravity chamber means to said filter element chamber means.

21. The apparatus of claim 20, wherein said at least one standpipe means is surrounded by said two stage filter assembly means.

22. The apparatus of claim 19, wherein said two stage filter assembly means includes a first stage means comprised of a pleated cellulose media, felt, fiberglass and foam composite.

23. The apparatus of claim 19, wherein said two stage filter assembly means includes a second stage comprised of a pleated cellulose media treated with a water repellent.

* * * * *